US012647962B2

(12) United States Patent　　(10) Patent No.:　US 12,647,962 B2
Li　　(45) Date of Patent:　　Jun. 2, 2026

(54) METHOD AND DEVICE FOR DETERMINING BEAM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 309 days.

(21) Appl. No.: 18/278,359

(22) PCT Filed: Feb. 25, 2021

(86) PCT No.: PCT/CN2021/077964

§ 371 (c)(1),
(2) Date: Aug. 22, 2023

(87) PCT Pub. No.: WO2022/178780

PCT Pub. Date: Sep. 1, 2022

(65) Prior Publication Data

US 2024/0147451 A1　　May 2, 2024

(51) Int. Cl.
H04W 72/044　　(2023.01)
H04L 5/00　　(2006.01)
H04W 72/23　　(2023.01)

(52) U.S. Cl.
CPC ......... H04W 72/046 (2013.01); H04L 5/0053 (2013.01); H04W 72/23 (2023.01)

(58) Field of Classification Search
None
See application file for complete search history.

(56) References Cited

U.S. PATENT DOCUMENTS

| 2019/0297640 A1 | | 9/2019 | Liou et al. | |
| 2021/0227530 A1 | * | 7/2021 | Farag | H04B 7/0695 |
| 2021/0360602 A1 | * | 11/2021 | Zhou | H04B 7/0695 |
| 2022/0132549 A1 | * | 4/2022 | Yu | H04L 1/1861 |
| 2022/0225362 A1 | * | 7/2022 | Yi | H04L 1/189 |
| 2022/0264475 A1 | * | 8/2022 | Yi | H04W 52/42 |
| 2022/0408470 A1 | * | 12/2022 | Jung | H04B 7/06968 |

(Continued)

FOREIGN PATENT DOCUMENTS

| CN | 109891993 A | 6/2019 |
| CN | 110971361 A | 4/2020 |

(Continued)

OTHER PUBLICATIONS

PCT/CN2021/077964, International Search Report dated Nov. 5, 2021, 2 pages.

(Continued)

*Primary Examiner* — Clemence S Han
(74) *Attorney, Agent, or Firm* — Cozen O'Connor

(57) ABSTRACT

A method for determining a beam, performed by a terminal device, includes: receiving a first signaling from a network device, the first signaling for determining a scheduled communication transmission or reception; determining the scheduled communication transmission or reception; and performing the communication transmission or reception using a configured target beam in response to being incapable of determining a beam corresponding to the communication transmission or reception.

19 Claims, 4 Drawing Sheets

(56)    References Cited

U.S. PATENT DOCUMENTS

| | | | |
|---|---|---|---|
| 2023/0239125 A1* | 7/2023 | Yi | H04B 7/06968 |
| | | | 370/329 |
| 2023/0308237 A1* | 9/2023 | Yi | H04L 5/0098 |
| 2023/0328830 A1* | 10/2023 | Yi | H04B 7/06964 |
| | | | 370/329 |
| 2023/0337313 A1* | 10/2023 | Yi | H04L 5/0094 |
| 2023/0379835 A1* | 11/2023 | Matsumura | H04W 52/14 |
| 2023/0379902 A1* | 11/2023 | Matsumura | H04B 7/0695 |
| 2024/0032060 A1* | 1/2024 | Matsumura | H04W 76/20 |
| 2024/0063878 A1* | 2/2024 | Li | H04B 7/06952 |
| 2024/0098526 A1* | 3/2024 | Matsumura | H04L 5/0023 |
| 2024/0306015 A1* | 9/2024 | Matsumura | H04L 5/0053 |

FOREIGN PATENT DOCUMENTS

| | | | |
|---|---|---|---|
| CN | 110972171 A | 4/2020 |
| WO | WO 2020142899 A1 | 7/2020 |
| WO | WO 2020209282 A1 | 10/2020 |

OTHER PUBLICATIONS

European Patent Application No. 21927218.4 Search and Opinion dated Mar. 14, 2024, 10 pages.

Xiaomi, "Enhancements on Multi-TAP for PDCCH, PUCCH and PUSCH" 3GPP TSG-RAN WG1 Meeting #104-e, R1-2101093, Jan. 2021, 19 pages.

Chinese Patent Application No. 202180000587.4, Office Action dated Jun. 23, 2022, with English translation, 16 pages.

Indian Patent Application No. 202347063397, Office Action dated Jan. 14, 2025, 6 pages.

* cited by examiner

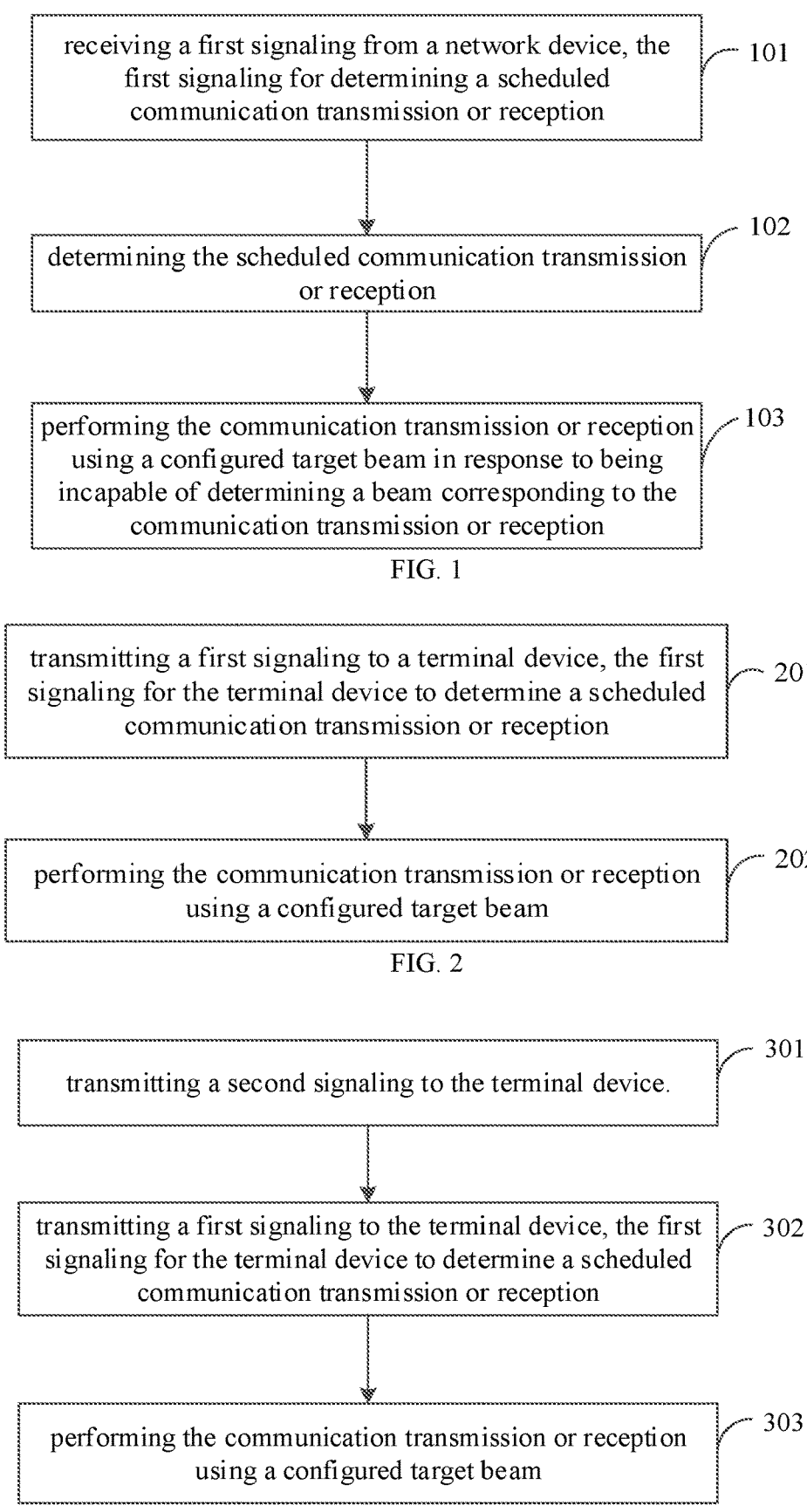

receiving a first signaling from a network device, the first signaling for determining a scheduled communication transmission or reception ⟋ 101 determining the scheduled communication transmission or reception ⟋ 102 performing the communication transmission or reception using a configured target beam in response to being incapable of determining a beam corresponding to the communication transmission or reception ⟋ 103

FIG. 1 transmitting a first signaling to a terminal device, the first signaling for the terminal device to determine a scheduled communication transmission or reception ⟋ 201 performing the communication transmission or reception using a configured target beam ⟋ 202

FIG. 2 transmitting a second signaling to the terminal device. ⟋ 301 transmitting a first signaling to the terminal device, the first signaling for the terminal device to determine a scheduled communication transmission or reception ⟋ 302 performing the communication transmission or reception using a configured target beam ⟋ 303

FIG. 3

METHOD AND DEVICE FOR DETERMINING BEAM

CROSS-REFERENCE TO RELATED APPLICATION

This application is a national phase of International Application No. PCT/CN2021/077964, filed on Feb. 25, 2021, the entire content of which is incorporated herein by reference.

TECHNICAL FIELD

The disclosure relates to the field of wireless communication technologies, and particularly to, a method and a device for determining a beam.

BACKGROUND

A wireless access network includes network devices that provide a wireless access function for stationary or mobile terminal devices. The network device may wirelessly communicate with the terminal device via one or more antennas. Since high-frequency channels used by antennas attenuate rapidly in new radio (NR) technologies such as in the communication frequency band designated as frequency range 2, beam-based transmission and reception may be used to ensure adequate coverage of signals.

SUMMARY

According to an aspect of the disclosure, a method for determining a beam is proposed and performed by a terminal device. The method includes:

receiving a first signaling from a network device, the first signaling for determining a scheduled communication transmission or reception;

determining the scheduled communication transmission or reception; and performing the communication transmission or reception using a configured target beam, in response to being incapable of determining a beam corresponding to the communication transmission or reception.

According to another aspect of the disclosure, a method for determining a beam is proposed and performed by a network device. The method includes:

transmitting a first signaling to a terminal device, the first signaling for the terminal device to determine a scheduled communication transmission or reception; and performing the communication transmission or reception using a configured target beam.

According to another aspect of the disclosure, a communication device is proposed and includes: a transceiver; a memory; and a processor respectively connected to the transceiver and the memory and configured to control transceiving of wireless signals of the transceiver and perform the method as described in the first aspect, by performing computer executable instructions on the memory.

BRIEF DESCRIPTION OF THE DRAWINGS

The above and/or additional aspects and advantages of the disclosure will become obvious and easy to understand from the following description of the embodiments in conjunction with the accompanying drawings, in which:

FIG. 1 is a flowchart illustrating a method for determining a beam performed by a terminal device according to some embodiments of the disclosure.

FIG. 2 is a flowchart illustrating another method for determining a beam according to some embodiments of the disclosure.

FIG. 3 is a flowchart illustrating another method for determining a beam performed by a network device according to some embodiments of the disclosure.

DETAILED DESCRIPTION

Figure 4:
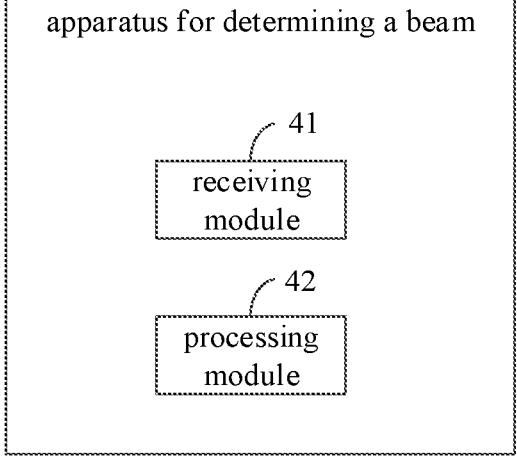
FIG. 4 is a block diagram illustrating an apparatus for determining a beam according to some embodiments of the disclosure.

Reference will now be made in detail to embodiments, examples of which are illustrated in the accompanying drawings. The following description refers to the accompanying drawings in which the same numbers in different accompanying drawings represent the same or similar elements unless otherwise represented. The implementations set forth in the following description of the embodiments do not represent all implementations consistent with the embodiments of the disclosure. Instead, they are merely examples of apparatuses and methods consistent with aspects related to embodiments of the disclosure as recited in the appended claims.

Terms used in embodiments of the disclosure are merely for describing specific examples and are not intended to limit the embodiments of the disclosure. The singular forms "one" and "the" used in the embodiments of the disclosure and the appended claims are also intended to include a multiple form, unless other meanings are clearly represented in the context. It should also be understood that the term "and/or" used in the disclosure refers to any or all of possible combinations including one or more associated listed items.

It should be understood that although terms "first", "second", "third", and the like are used in embodiments of the disclosure to describe various information, the information is not limited to the terms. These terms are merely used to differentiate information of a same type. For example, without departing from the scope of the embodiments of the disclosure, first information is also referred to as second information, and similarly the second information is also referred to as the first information. Depending on the context, for example, the term "if" used herein may be explained as "when" or "while", or "in response to . . . , it is determined that".

The embodiments of the disclosure are described in detail below. Examples of the embodiments are illustrated in the accompanying drawings where the same or similar numbers throughout indicate the same or similar elements. The embodiments described below by reference to the accompanying drawings are illustrative and are intended to interpret the disclosure and are not to be construed as a limitation of the disclosure.

The method and the apparatus for determining a beam, and the communication device, provided in the disclosure, are described by referring to the accompanying drawings.

Terms Interpretation

Transmission and reception point (TRP) or transmit/receive point (TRP), corresponds to a serving cell or a neighboring cell of a terminal device. One TRP includes one or more panels and each panel includes one or more co-location antennas.

A control resource set (CORESET) is resources config-ured, that is, resources for a PDCCH to transmit a downlink control information (DCI) signaling.

CORESET pool index: one CORESET pool index corre-sponds to one or more CORESETs and each CORESET pool index corresponds to one TRP or one panel. That is, CORE-SETS corresponding to different CORESET pool indexes are for PDCCH channels of different TRPs or panels.

PDCCH: physical downlink control channel;

PDSCH: physical downlink shared channel;

PUCCH: physical uplink control channel;

PUSCH: physical uplink shared channel;

SRS: sounding reference signal;

TCI: transmission configuration indication;

CSI-RS: channel state information reference signal.

In release 16 (Rel-16), dedicated beams for a physical downlink control channel (PDCCH), a physical downlink shared channel (PDSCH), a physical uplink shared channel (PUSCH), a physical uplink control channel (PUCCH), various uplink reference signals, and various downlink reference signals, are indicated independently, so that the signaling overhead is larger. Therefore, a common beam may be used to reduce the signaling overhead, that is, one common beam is indicated for transmissions or receptions of channels and/or reference signals. In this case, when a terminal is incapable of determining beams of certain chan-nels and/or reference signals, it is a problem to be solved how to perform communication transmissions or receptions.

FIG. 1 is a flowchart illustrating a method for determining a beam according to some embodiments of the disclosure. The method is performed by a terminal device.

As illustrated in FIG. 1, the method includes the following steps.

At step 101, a first signaling from a network device is received. The first signaling is used to determine a scheduled communication transmission or reception.

Terminal devices may be distributed in an entire mobile communication system and each terminal device may be stationary or mobile. The terminal device, for those skilled in the art, may also be referred to as a mobile station, a subscriber station, a mobile unit, a user unit, a wireless unit, a remote unit, a mobile device, a terminal device, a wireless device, a wireless communication device, a remote device, a mobile subscriber station, an access user device, a mobile user device, a wireless user device, a remote user device, a handheld device, a user agent, a mobile client, a client, a vehicle-mounted device, a wearable device, or some other suitable terminologies. The terminal device may be a cell phone, a personal digital assistant (PDA), a wireless modem, a wireless communication device, a handheld device, a tablet computer, a laptop computer, a cordless telephone, a wireless local loop (WLL) station, or the like, which may communicate with the network device in the mobile com-munication system.

The network device is deployed in a wireless access network to provide a wireless access function for the ter-minal device. The network device may be a base station (BS). The network device may wirelessly communicate with the terminal device via one or more antennas. The network device may provide a communication coverage for a geo-graphic area where the network device is located. The BS may include different types, such as a macro BS, a micro BS, a relay station, and an access point. In some embodiments, the BS, for those skilled in the art, may be referred to as a BS transceiver, a wireless BS, an access point, a wireless transceiver, a basic service set (BSS), an extended service set (ESS), a Node B, an evolved Node B (eNB or eNodeB), or some other suitable terminologies. For example, in a fifth generation (5G) system, the BS is referred to as a gNB. For convenience of description, in embodiments of the disclo-sure, the above device that provides the wireless communi-cation function for the terminal device is collectively referred to as the network device.

The first signaling may be DCI or a medium access control (MAC) control element (CE).

In some embodiments, the communication transmission or reception includes at least one of: a communication transmission or reception carried in a physical channel or a reference signal.

The physical channel includes at least one of: a PDCCH, a PDSCH, a PUCCH, a PUSCH, or a physical random access channel (PRACH); and/or the physical channel includes at least one of channels in a sidelink.

The reference signal includes at least one of: a CSI-RS, an SRS, a phase tracking reference signal (PTRS), or a syn-chronization signal block (SSB); and/or the reference signal includes at least one of reference signals of a sidelink.

At step 102, the scheduled communication transmission or reception is determined.

In some embodiments, the scheduled communication transmission or reception is determined according to the indication of the first signaling, for example, the scheduled communication transmission or reception is at least one of: the communication transmission or reception carried in the physical channel or the reference signal.

At step 103, the communication transmission or reception is performed using a configured target beam in response to being incapable of determining a beam corresponding to the communication transmission or reception.

In an implementation of some embodiments, the terminal device is a terminal device that is configured with a common beam. The common beam is a beam for at least one communication transmission or reception. The communica-tion transmission or reception may be performed using the configured target beam in response to being incapable of determining a common beam corresponding to the commu-nication transmission or reception.

The target beam may be a target beam for an uplink transmission or reception, and/or a target beam for a down-link transmission or reception.

In another implementation of some embodiments, the terminal device is not configured with the common beam. The communication transmission or reception may be per-formed using the configured target beam in response to being incapable of determining a non-common beam corre-sponding to the communication transmission or reception.

In some embodiments, the terminal device may determine the target beam in response to being incapable of determin-ing the beam corresponding to the communication transmis-sion or reception, thereby performing the communication transmission or reception using the configured target beam, which achieves the communication transmission or recep-tion based on the determined configured target beam and improves the signal quality of the beam transmission or reception.

It should be noted that the target beam in some embodi-ments is preset and the configured target beam includes one or more beams, which is a default beam that may be selected by the terminal device in response to being incapable of determining the beam corresponding to the communication transmission or reception, to ensure the communication transmission or reception between the terminal device and the network device. The manner how to determine the configured target beam will be described in subsequent embodiments.

In the method for determining a beam, provided in embodiments of the disclosure, the terminal device determines the scheduled communication transmission or reception based on the first signaling that is transmitted by the network device and performs the communication transmission or reception using the configured target beam in response to being incapable of determining the beam corresponding to the communication transmission or reception, which achieves the communication transmission or reception based on the determined configured target beam and improves the signal quality of the beam transmission or reception.

Based on the above embodiments, another method for determining a beam is provided in some embodiments, which illustrates how to determine the target beam and is described below with regards to different implementations.

In an implementation of some embodiments, the first signaling is carried in a target PDCCH and the target beam is a beam of a first CORESET, in which the first CORESET is configured for a transmission or reception of the target PDCCH.

For example, in one scenario, the communication transmission or reception is a communication transmission or reception carried in the PDSCH.

As an implementation, the first CORESET and the communication transmission or reception belong to the same common beam group. The same common beam group refers to that each communication transmission or reception in the common beam group corresponds to the same common beam.

As another implementation, the first CORESET and the communication transmission or reception belong to different common beam groups. For example, the communication transmission or reception is in common beam group 1, and the first CORESET is in common beam group 2; or the communication transmission or reception is in common beam group 3, and the first CORESET is in common beam group 5; or the communication transmission or reception is in common beam group 1, and the first CORESET is not in any common beam group.

It needs to be noted that there are one or more members included in the common beam group, each of which is one communication transmission or reception. For example, members included in the common beam group include communication transmission(s) or reception(s) carried in the PDCCH and communication transmission(s) or reception(s) carried in the PDSCH; for another example, the member(s) included in the common beam group includes communication transmission(s) or reception(s) carried in the PDCCH and only includes communication transmission(s) or reception(s) carried in the PDCCH corresponding to a certain or more CORESETs. The common beam group may only include uplink communication transmission(s) or reception(s), or only include downlink communication transmission(s) or reception(s), or include simultaneously uplink communication transmission(s) or reception(s) and downlink communication transmission(s) or reception(s). The communication transmission(s) or reception(s) associated with one TRP or one panel may belong to one or more common beam groups.

It should be understood that, in some embodiments, in order to facilitate description of the implementation of determining the target beam, the CORESET is classed in different implementations and is specifically classed into a first CORESET and a second CORESET. There is no priority between the first CORESET and the second CORESET, which does not constitute a limitation of the embodiments.

In a second implementation of some embodiments, the target beam is a beam of the second CORESET. The second CORESET is a CORESET with a smallest CORESET index in a target time unit of a search space that has monitored; and the target time unit is a most recent time unit in each time unit of the search space that has monitored.

In some embodiments, the time unit may be a slot, a mini-slot, a symbol, or the like, which is not limited in some embodiments.

In a first scenario, whether the second CORESERT and the communication transmission or reception belong to the same common beam group is not distinguished.

In some embodiments, the second CORESET is a CORESET with a smallest CORESET index in a target slot of the search space that has monitored, and a CORESET pool index of the second CORESET is the same as a CORESET pool index of a CORESET corresponding to a PDCCH for scheduling the communication transmission or reception. For example, the CORESET pool index of the CORESET corresponding to the PDCCH for scheduling the communication transmission or reception is a first CORESET pool index, and the target time unit is the most recent time unit that has passed and includes a time unit corresponding to the search space associated with the CORESET of the first CORESET pool index.

As a first implementation, the target time unit of the search space that has monitored corresponds to a plurality of CORESETs, which are respectively CORESET1, CORESET2, CORESET4, and CORESET5. If the second CORESET is CORESET1 with the smallest index in the plurality of CORESETs, the target beam is the beam corresponding to CORESET1.

As a second implementation, the target time unit of the search space that has monitored corresponds to one CORESET, denoted as CORESET2. The second CORESET is CORESET2 and the target beam is a beam of CORESET2.

A search space set is configured to configure a time domain position of the PDCCH and is associated with the CORESET.

In the first implementation and the second implementation, furthermore, the most recent two time units of the search space that has monitored are a first time unit and a second time unit, and the first time unit is earlier than the second time unit, that is, the second time unit is more recent than the first time unit. However, the CORESET corresponding to the search space that needs to be monitored in the second time unit does not correspond to the CORESET of the first CORESET pool index, and the CORESET corresponding to the search space that needs to be monitored in the first time unit corresponds to the CORESET of the first CORESET pool index. The CORESET pool index of the CORESET corresponding to the PDCCH for scheduling the communication transmission or reception is the first CORESET pool index. Thus, the target beam needs to be determined from the CORESET of the first CORESET pool index corresponding to the search space set in the first time unit.

In a second scenario, the second CORESERT and the communication transmission or reception belong to the same common beam group, so that the second CORESET is a CORESET with a smallest index, which belongs to the same common beam group with the communication transmission or reception, in the target time unit of the search space that has monitored. For example, the CORESET with the smallest index is CORESET 3 and the target beam is a beam of CORESET 3.

In a third implementation of some embodiments, the target beam is a beam corresponding to a minimum code point in TCI code points configured by the network device.

The TCI code points are carried in a DCI signaling.

As an implementation, an MAC CE from the network device is received, the MAC CE for indicating a corresponding relationship between the TCI code points and one or more beams, and the beam corresponding to the minimum code point in the TCI code points indicated in the DCI signaling is determined according to the MAC CE, that is, the beam corresponding to the minimum code point in the TCI code points.

In one scenario, the MAC CE activates beams corresponding to a plurality of TCI code points and there is at least one code point which corresponds to one beam, in which case, the beam corresponding to the minimum code point in the plurality of code points each corresponding to one beam in the DCI is used as the target beam.

In another scenario, the MAC CE activates beams corresponding to a plurality of TCI code points and there is at least one code point which corresponds to two beams, in which case, two beams corresponding to the minimum code point in the plurality of code points each corresponding to two beams in the DCI are used as target beams.

In some embodiments, the minimum code point may be a minimum code point in all TCI code points, or a minimum code point in TCI code points each corresponding to a plurality of beams, or a minimum code point in TCI code points each corresponding to a single beam.

It needs to be noted that, the beam corresponding to the minimum code point includes a dedicated beam for a communication transmission or reception such as a dedicated beam for a single channel or a reference signal, or a common beam for a multi-channel or a multi-reference signal, or a common beam for an uplink and/or downlink communication, or a common beam for one or more TRPs or panels. The beam may also be indicated by a TCI state and/or spatial relation information.

Based on the above embodiments, an implementation is provided in the disclosure and illustrates how to determine the target beam corresponding to the current communication transmission or reception when the common beam corresponding to the communication transmission or reception has been indicated in the signaling.

In some embodiments, the target beam is determined by:
determining the target beam according to a common beam indicated in a second signaling.

The second signaling is a latest signaling for indicating the common beam corresponding to the communication transmission or reception in received signalings.

In some embodiments, a time interval between a receiving moment of the second signaling and a receiving moment of the first signaling is less than a first threshold value; and/or a time interval between a receiving moment of the second signaling and a moment occupied by the communication transmission or reception is less than a second threshold value.

In some embodiments, the common beam is determined based on the latest signaling for indicating the common beam corresponding to the communication transmission or reception in received signalings. If a further signaling for indicating the common beam corresponding to the common transmission or reception is not received in a set period of time, the common beam determined based on the latest signaling for indicating the common beam corresponding to the communication transmission or reception in received signalings is determined as the current common beam and the common beam is determined as the target beam, to determine the target beam. If the second signaling for indicating the common beam is not received beyond the set period of time, at least one implementation in the first implementation to the third implementation in the above embodiments is adopted to determine the target beam, to improve the accuracy of determining the target beam.

In a scenario, the second beam is an MAC CE and the MAC CE indicates one beam for one common beam group, that is, the common beam is one beam indicated by the MAC CE for one common beam group.

In a second scenario, the second signaling is DCI, that is, the common beam is indicated by the DCI. An MAC CE indicates a plurality of beams for one common beam group, and the common beam for the common beam group, indicated by DCI, is one of the plurality of beams indicated by MAC CE for the common beam group.

As an implementation, the common beam indicated by the DCI is carried in the PDCCH of the CORESET that is in the same common beam group with the communication transmission or reception.

As another implementation, the common beam indicated by the DCI is carried in the PDCCH of the CORESET that is not in the same common beam group with the communication transmission or reception.

It needs to be noted that, there is one or more target beams determined in the above any one implementation, in which the network device includes at least one TRP and the plurality of target beams correspond to the same TRP or different TRPs. The TRP is a transmission reception point and different TRPs are distinguished by different TRP identifiers or different CORESET pool indexes or different reference signal resource identifiers.

In the method for determining a beam in some embodiments, the terminal device determines the scheduled communication transmission or reception based on the first signaling that is transmitted by the network device, may accurately determine the target beam based on the method for determining the target beam, and may further perform the communication transmission or reception using the target beam in response to being incapable of determining the beam corresponding to the communication transmission or reception, which achieves the communication transmission or reception based on the determined configured target beam and improves the signal quality of the beam transmission or reception.

Based on the above embodiments, a possible implementation of the method for determining a beam is provided according to some embodiments, which illustrates situations of being incapable of determining the beam corresponding to the communication transmission or reception. The situations are described below with regards to different implementations.

As an implementation, it is incapable to determine the beam corresponding to the communication transmission or reception in response to a time interval between a receiving moment of the first signaling and a moment occupied by the communication transmission or reception being less than a third threshold value.

It needs to be noted that a time unit of the receiving moment of the first signaling and the moment occupied by the communication transmission or reception may be a symbol, a slot, a mini-slot, or the like.

In a scenario, when the time unit is a symbol, the time interval between the receiving moment of the first signaling and the moment occupied by the communication transmission or reception may be a time interval between the first symbol at the receiving moment of the first signaling and the first symbol at the moment occupied by the communication transmission or reception; or a time interval between the first symbol at the receiving moment of the first signaling and the last symbol at the moment occupied by the communication transmission or reception; or a time interval between the last symbol at the receiving moment of the first signaling and the first symbol at the moment occupied by the communication transmission or reception; or a time interval between the last symbol at the receiving moment of the first signaling and the last symbol at the moment occupied by the communication transmission or reception.

In a scenario, when the time unit is a slot, the time interval between the receiving moment of the first signaling and the moment occupied by the communication transmission or reception may be a time interval between the first slot at the receiving moment of the first signaling and the first slot at the moment occupied by the communication transmission or reception; or a time interval between the first slot at the receiving moment of the first signaling and the last slot at the moment occupied by the communication transmission or reception; or a time interval between the last slot at the receiving moment of the first signaling and the first slot at the moment occupied by the communication transmission or reception; or a time interval between the last slot at the receiving moment of the first signaling and the last slot at the moment occupied by the communication transmission or reception.

In a scenario, when the time unit is a mini-slot, the time interval between the receiving moment of the first signaling and the moment occupied by the communication transmission or reception may be a time interval between the first mini-slot at the receiving moment of the first signaling and the first mini-slot at the moment occupied by the communication transmission or reception; or a time interval between the first mini-slot at the receiving moment of the first signaling and the last mini-slot at the moment occupied by the communication transmission or reception; or a time interval between the last mini-slot at the receiving moment of the first signaling and the first mini-slot at the moment occupied by the communication transmission or reception; or a time interval between the last mini-slot at the receiving moment of the first signaling and the last mini-slot at the moment occupied by the communication transmission or reception.

In some embodiments, the first signaling may be a DCI signaling or an MAC CE signaling.

It needs to be noted that, when the first signaling is the MAC CE signaling, MAC CE signalings corresponding to different communication transmissions or receptions may be same or different. For example, an MAC CE signaling for activating communication transmission or reception 1 may be an MAC CE signaling for activating a communication transmission or reception associated with communication transmission or reception 1, for example, communication transmission or reception 2 and/or communication transmission or reception 3.

Beams of communication transmissions or receptions corresponding to communication transmission or reception 1, communication transmission or reception 2 and communication transmission or reception 3 are same.

As a second implementation, it is incapable to determine the beam corresponding to the communication transmission or reception in response to not carrying beam indication information in the first signaling. Not carrying beam indication information may include not carrying indication information of any beam, or not carrying indication information of the beam corresponding to the communication transmission or reception, that is, not carrying indication information of the beam corresponding to part communication transmission or reception In some embodiments, the first signaling may be a DCI signaling or an MAC CE signaling.

In a scenario, it is incapable to determine the beam corresponding to the communication transmission or reception in response to not carrying beam indication information in the DCI signaling.

In another scenario, it is incapable to determine the beam corresponding to the communication transmission or reception in response to not carrying beam indication information in the MAC CE signaling.

It needs to be noted that, when the first signaling is the MAC CE signaling, MAC CE signalings corresponding to different communication transmissions or receptions may be same or different. For example, an MAC CE signaling for activating communication transmission or reception 1 may be an MAC CE signaling for activating a communication transmission or reception associated with communication transmission or reception 1, for example, communication transmission or reception 2 and/or communication transmission or reception 3. Beams of communication transmissions or receptions corresponding to communication transmission or reception 1, communication transmission or reception 2 and communication transmission or reception 3 are same. Not carrying beam indication information may include not carrying beam indication information of any communication transmission or reception, or not carrying beam indication information of part communication transmission or reception.

As a third implementation, it is incapable to determine the common beam corresponding to the communication transmission or reception in response to a time interval between a transmitting moment of a target Hybrid Automatic Repeat reQuest (HARQ) Acknowledgment (ACK) feedback and a moment corresponding to the communication transmission or reception being less than a fourth threshold value.

The target HARQ ACK feedback is an HARQ ACK feedback transmitted by the terminal device to the network device for the first signaling.

In the method for determining a beam in some embodiments, the terminal device determines the scheduled communication transmission or reception based on the first signaling that is transmitted by the network device, may accurately determine the target beam based on the method for determining the target beam, and further may perform the communication transmission or reception using the target beam in response to being incapable of determining the beam corresponding to the communication transmission or reception, which achieves the communication transmission or reception based on the determined configured target beam and improves the signal quality of the beam transmission or reception.

Based on the above embodiments, the terminal device may receive configuration information from the network device. The configuration information may be radio resource control (RRC) and/or MAC CE configured to indicate at least one member in a common beam group, that is, indicate which communication transmission(s) or reception(s) may be included in the common beam group.

In some embodiments, each communication transmission or reception in the common beam group corresponds to the same common beam.

The communication transmission or reception includes at least one of: a communication transmission or reception carried in a physical channel or a reference signal.

The physical channel includes at least one of: a PDCCH, a PDSCH, a PUCCH, a PUSCH, or a PRACH; and/or the physical channel includes at least one of channels in a sidelink.

The reference signal includes at least one of: a CSI-RS, an SRS, a PTRS or an SSB; and/or the reference signal includes at least one of reference signals in a sidelink.

In order to achieve the above embodiments, another method for determining a beam is provided in the disclosure and is executed by the network device. FIG. 2 is a flowchart illustrating a method for determining a beam according to some embodiments of the disclosure. As illustrated in FIG. 2, the method includes the following steps.

At step 201, a first signaling is transmitted to a terminal device, in which the first signaling is used for the terminal device to determine a scheduled communication transmission or reception.

The network device is deployed in a wireless access network to provide a wireless access function for the terminal device. The network device may be a base station (BS). The network device may wirelessly communicate with the terminal device via one or more antennas. The network device may provide a communication coverage for a geographic area where the network device is located. The BS may include different types, such as a macro BS, a micro BS, a relay station, and an access point. In some embodiments, the BS, for those skilled in the art, may be referred to as a BS transceiver, a wireless BS, an access point, a wireless transceiver, a basic service set (BSS), an extended service set (ESS), a Node B, an evolved Node B (eNB or eNodeB), or some other suitable terminologies. For example, in a fifth generation (5G) system, the BS is referred to as a gNB. For convenience of description, in embodiments of the disclosure, the above device that provides the wireless communication function for the terminal device is collectively referred to as the network device.

Terminal devices may be distributed in an entire mobile communication system and each terminal device may be stationary or mobile. The terminal device, for those skilled in the art, may also be referred to as a mobile station, a subscriber station, a mobile unit, a user unit, a wireless unit, a remote unit, a mobile device, a terminal device, a wireless device, a wireless communication device, a remote device, a mobile subscriber station, an access user device, a mobile user device, a wireless user device, a remote user device, a handheld device, a user agent, a mobile client, a client, a vehicle-mounted device, a wearable device, or some other suitable terminologies. The terminal device may be a cell phone, a personal digital assistant (PDA), a wireless modem, a wireless communication device, a handheld device, a tablet computer, a laptop computer, a cordless telephone, a wireless local loop (WLL) station, or the like, which may communicate with the network device in the mobile communication system.

The first signaling may be DCI or an MAC CE.

In some embodiments, the communication transmission or reception includes at least one of: a communication transmission or reception carried in a physical channel or a reference signal.

The physical channel includes at least one of: a PDCCH, a PDSCH, a PUCCH, a PUSCH, or a PRACH; and/or the physical channel includes at least one of channels in a sidelink.

The reference signal includes at least one of: a CSI-RS, an SRS, a PTRS, or an SSB; and/or the reference signal includes at least one of reference signals of a sidelink.

At step 202, the communication transmission or reception is performed using a configured target beam.

In some embodiments, the network device performs the communication transmission or reception using the configured target beam, including transmitting and/or receiving.

In an implementation of some embodiments, the terminal device is a terminal device that is configured with a common beam. The common beam is a beam for at least one communication transmission or reception. The communication transmission or reception may be performed using the configured target beam in response to being incapable of determining a common beam corresponding to the communication transmission or reception.

In another implementation of some embodiments, the terminal device is not configured with the common beam. The communication transmission or reception may be performed using the configured target beam in response to being incapable of determining a non-common beam corresponding to the communication transmission or reception.

In some embodiments, the terminal device may determine the target beam in response to being incapable of determining the beam corresponding to the communication transmission or reception, thereby performing the communication transmission or reception using the configured target beam, which achieves the communication transmission or reception based on the determined configured target beam and improves the signal quality of the beam transmission or reception.

It should be noted that the target beam in some embodiments is preset and the configured target beam includes one or more beams, which is a default beam that may be selected by the terminal device in response to being incapable of determining the beam corresponding to the communication transmission or reception, to ensure the communication transmission or reception between the terminal device and the network device. The manner how to determine the configured target beam will be described in subsequent embodiments.

In the method for determining a beam, provided in embodiments of the disclosure, the network device transmits the first signaling to the terminal device, the first signaling for the terminal device to determine the scheduled communication transmission or reception, and the network device performs the communication transmission or reception using the configured target beam, which achieves the communication transmission or reception based on the determined configured target beam and improves the signal quality of the beam transmission or reception.

Based on the above embodiments, FIG. 3 is a flowchart illustrating another method for determining a beam according to some embodiments of the disclosure. The method is performed by a network device. As illustrated in FIG. 3, the method includes the following steps.

At step 301, a second signaling is transmitted to the terminal device.

The second signaling is a latest signaling for indicating the common beam corresponding to the communication transmission or reception in received signalings.

In some embodiments, a time interval between a receiving moment of the second signaling and a receiving moment of the first signaling is less than a first threshold value; and/or a time interval between a receiving moment of the second signaling and a moment occupied by the communication transmission or reception is less than a second threshold value.

In some embodiments, the common beam is determined by the terminal device based on the latest signaling for indicating the common beam corresponding to the communication transmission or reception in received signalings. If a further signaling for indicating the common beam corresponding to the common transmission or reception is not received in a set period of time, the common beam determined based on the latest signaling for indicating the common beam corresponding to the communication transmission or reception in received signalings is determined as the current common beam and the common beam is determined as the target beam, to determine the target beam. If the second signaling for indicating the common beam is not received beyond the set period of time, at least one implementation in the first implementation to the third implementation in the below embodiments is adopted to determine the target beam, to improve the accuracy of determining the target beam.

In a scenario, the second beam is an MAC CE and the MAC CE indicates one beam for one common beam group, that is, the common beam is one beam indicated by the MAC CE for one common beam group.

In a second scenario, the second signaling is DCI, that is, the common beam is indicated by the DCI. An MAC CE indicates a plurality of beams for one common beam group, and the common beam for the common beam group, indicated by DCI, is one of the plurality of beams indicated by MAC CE for the common beam group.

As an implementation, the common beam indicated by the DCI is carried in the PDCCH of the CORESET that is in the same common beam group with the communication transmission or reception.

As another implementation, the common beam indicated by the DCI is carried in the PDCCH of the CORESET that is not in the same common beam group with the communication transmission or reception.

It needs to be noted that, there is one or more target beams determined in the above any one implementation, in which the network device includes at least one TRP and the plurality of target beams correspond to the same TRP or different TRPs. The TRP is a transmission reception point and different TRPs are distinguished by different TRP identifiers or different CORESET pool indexes.

At step 302, a first signaling is transmitted to the terminal device, in which the first signaling is used for the terminal device to determine a scheduled communication transmission or reception.

At step 303, the communication transmission or reception is performed using a configured target beam in response to receiving that the terminal device is incapable of determining a beam corresponding to the communication transmission or reception.

In detail, descriptions of the above any one method embodiment may be referenced, which will not be repeated in some embodiments.

In the method for determining a beam provided in embodiments of the disclosure, the network device transmits the first signaling to the terminal device, in which the first signaling is used by the terminal device to determine the scheduled communication transmission or reception, and the network device performs the communication transmission or reception using the configured target beam, which achieves the communication transmission or reception based on the determined configured target beam and improves the signal quality of the beam transmission or reception.

Based on the above embodiments, another method for determining a beam is provided according to some embodiments, which illustrates how to determine the target beam in response to not receiving the second signaling for indicating the common beam beyond a set period of time, to improve the accuracy of determining the target beam, which is described below with regards to different implementations.

In an implementation of some embodiments, the first signaling is carried in a target PDCCH and the target beam is a beam of a first CORESET, in which the first CORESET is configured for a transmission or reception of the target PDCCH.

In one scenario, the communication transmission or reception is a communication transmission or reception carried in the PDSCH.

As an implementation, the first CORESET and the communication transmission or reception belong to the same common beam group. The same common beam group refers to that each communication transmission or reception in the common beam group corresponds to the same common beam.

As another implementation, the first CORESET and the communication transmission or reception belong to different common beam groups. For example, the communication transmission or reception is in common beam group 1, and the first CORESET is in common beam group 2; or the communication transmission or reception is in common beam group 3, and the first CORESET is in common beam group 5; or the communication transmission or reception is in common beam group 1, and the first CORESET is not in any common beam group.

It needs to be noted that there are one or more members included in the common beam group, each of which is one communication transmission or reception. For example, members included in the common beam group include communication transmission(s) or reception(s) carried in the PDCCH and communication transmission(s) or reception(s) carried in the PDSCH; for another example, the member(s) included in the common beam group includes communication transmission(s) or reception(s) carried in the PDCCH and only includes communication transmission(s) or reception(s) carried in the PDCCH corresponding to a certain or more CORESETs. The common beam group may only include uplink communication transmission(s) or reception(s), or only include downlink communication transmission(s) or reception(s), or include simultaneously uplink communication transmission(s) or reception(s) and downlink communication transmission(s) or reception(s). The communication transmission(s) or reception(s) associated with one TRP or one panel may belong to one or more common beam groups.

It should be understood that, in some embodiments, in order to facilitate description of the implementation of determining the target beam, the CORESET is classed in different implementations and is specifically classed into a first CORESET and a second CORESET. There is no priority between the first CORESET and the second CORESET, which does not constitute a limitation of the embodiments.

In a second implementation of some embodiments, the target beam is a beam of the second CORESET. The second CORESET is a CORESET with a smallest CORESET index in a target time unit of a search space that has monitored; and the target time unit is a most recent time unit in each time unit of the search space that has monitored.

In some embodiments, the time unit may be a slot, a mini-slot, a symbol, or the like, which is not limited in some embodiments.

In a first scenario, whether the second CORESERT and the communication transmission or reception belong to the same common beam group is not distinguished.

In some embodiments, the second CORESET is a CORESET with a smallest CORESET index in a target time unit of the search space that has monitored, and a CORESET pool index of the second CORESET is the same as a CORESET pool index of a CORESET corresponding to a PDCCH for scheduling the communication transmission or reception. For example, the CORESET pool index of the CORESET corresponding to the PDCCH for scheduling the communication transmission or reception is a first CORESET pool index, and the target time unit is the most recent time unit that has passed and includes a time unit corresponding to the search space associated with the CORESET of the first CORESET pool index.

As a first implementation, the target time unit of the search space that has monitored corresponds to a plurality of CORESETs, which are respectively CORESET1, CORESET2, CORESET4, and CORESET5. If the second CORESET is CORESET1 with the smallest index in the plurality of CORESETs, the target beam is the beam corresponding to CORESET1.

As a second implementation, the target time unit of the search space that has monitored corresponds to one CORESET, denoted as CORESET2. The second CORESET is CORESET2 and the target beam is a beam of CORESET2.

A search space set is configured to configure a time domain position of the PDCCH and is associated with the CORESET.

In the first implementation and the second implementation, furthermore, the most recent two time units of the search space that has monitored are a first time unit and a second time unit, and the first time unit is earlier than the second time unit, that is, the second time unit is more recent than the first time unit. However, the CORESET corresponding to the search space that needs to be monitored in the second time unit does not correspond to the CORESET of the first CORESET pool index, and the CORESET corresponding to the search space that needs to be monitored in the first time unit corresponds to the CORESET of the first CORESET pool index. The CORESET pool index of the CORESET corresponding to the PDCCH for scheduling the communication transmission or reception is the first CORESET pool index. Thus, the target beam needs to be determined from the CORESET of the first CORESET pool index corresponding to the search space set in the first time unit.

In a second scenario, the second CORESERT and the communication transmission or reception belong to the same common beam group, so that the second CORESET is a CORESET with a smallest index, which belongs to the same common beam group with the communication transmission or reception, in the target time unit of the search space that has monitored. For example, the CORESET with the smallest index is CORESET 3 and the target beam is a beam of CORESET 3.

In a third implementation of some embodiments, the target beam is a beam corresponding to a minimum code point in TCI code points configured by the network device. The TCI code points are carried in a DCI signaling.

As an implementation, an MAC CE from the network device is received, the MAC CE for indicating a corresponding relationship between each TCI code point and one or more beams, and the beam corresponding to the minimum code point in the TCI code points indicated by the DCI signaling is determined according to the MAC CE, that is, the beam corresponding to the minimum code point in the TCI code points.

In one scenario, the MAC CE activates beams corresponding to a plurality of TCI code points and there is at least one code point which corresponds to one beam, in which case, the beam corresponding to the minimum code point in the plurality of code points each corresponding to one beam in the DCI is used as the target beam.

In another scenario, the MAC CE activates beams corresponding to a plurality of TCI code points and there is at least one code point which corresponds to two beams, in which case, two beams corresponding to the minimum code point in the plurality of code points each corresponding to two beams in the DCI are used as target beams.

In some embodiments, the minimum code point may be a minimum code point in all TCI code points, or a minimum code point in TCI code points each corresponding to a plurality of beams, or a minimum code point in TCI code points each corresponding to a single beam.

It needs to be noted that, the beam corresponding to the minimum code point includes a dedicated beam for a communication transmission or reception such as a dedicated beam for a single channel or a reference signal, or a common beam for a multi-channel or a multi-reference signal, or a common beam for an uplink and/or downlink communication, or a common beam for one or more TRPs or panels. The beam may also be indicated by a TCI state and/or spatial relation information.

Based on the above embodiments, a possible implementation of the method for determining a beam is provided according to some embodiments, which illustrates situations of being incapable of determining the beam corresponding to the communication transmission or reception. The situations are described below with regards to different implementations.

As an implementation, it is incapable to determine the beam corresponding to the communication transmission or reception in response to a time interval between a receiving moment of the first signaling and a moment occupied by the communication transmission or reception being less than a third threshold value.

It needs to be noted that a time unit of the receiving moment of the first signaling and the moment occupied by the communication transmission or reception may be a symbol, a slot, a mini-slot, or the like.

In a scenario, when the time unit is a symbol, the time interval between the receiving moment of the first signaling and the moment occupied by the communication transmission or reception may be a time interval between the first symbol at the receiving moment of the first signaling and the first symbol at the moment occupied by the communication transmission or reception; or a time interval between the first symbol at the receiving moment of the first signaling and the last symbol at the moment occupied by the communication transmission or reception; or a time interval between the last symbol at the receiving moment of the first signaling and the first symbol at the moment occupied by the communication transmission or reception; or a time interval between the last symbol at the receiving moment of the first signaling and the last symbol at the moment occupied by the communication transmission or reception.

In a scenario, when the time unit is a slot, the time interval between the receiving moment of the first signaling and the moment occupied by the communication transmission or reception may be a time interval between the first slot at the receiving moment of the first signaling and the first slot at the moment occupied by the communication transmission or reception; or a time interval between the first slot at the receiving moment of the first signaling and the last slot at the moment occupied by the communication transmission or reception; or a time interval between the last slot at the receiving moment of the first signaling and the first slot at the moment occupied by the communication transmission or reception; or a time interval between the last slot at the receiving moment of the first signaling and the last slot at the moment occupied by the communication transmission or reception.

In a scenario, when the time unit is a mini-slot, the time interval between the receiving moment of the first signaling and the moment occupied by the communication transmission or reception may be a time interval between the first mini-slot at the receiving moment of the first signaling and the first mini-slot at the moment occupied by the communication transmission or reception; or a time interval between the first mini-slot at the receiving moment of the first signaling and the last mini-slot at the moment occupied by the communication transmission or reception; or a time interval between the last mini-slot at the receiving moment of the first signaling and the first mini-slot at the moment occupied by the communication transmission or reception; or a time interval between the last mini-slot at the receiving moment of the first signaling and the last mini-slot at the moment occupied by the communication transmission or reception.

In some embodiments, the first signaling may be a DCI signaling or an MAC CE signaling.

It needs to be noted that, when the first signaling is the MAC CE signaling, MAC CE signalings corresponding to different communication transmissions or receptions may be same or different. For example, an MAC CE signaling for activating communication transmission or reception 1 may be an MAC CE signaling for activating a communication transmission or reception associated with communication transmission or reception 1, for example, communication transmission or reception 2 and/or communication transmission or reception 3. Beams of communication transmissions or receptions corresponding to communication transmission or reception 1, communication transmission or reception 2 and communication transmission or reception 3 are same.

As a second implementation, it is incapable to determine the beam corresponding to the communication transmission or reception in response to not carrying beam indication information in the first signaling. Not carrying beam indication information may include not carrying indication information of any beam, or not carrying indication information of the beam corresponding to part communication transmission or reception In some embodiments, the first signaling may be a DCI signaling or an MAC CE signaling.

In a scenario, it is incapable to determine the beam corresponding to the communication transmission or reception in response to not carrying beam indication information in the DCI signaling.

In another scenario, it is incapable to determine the beam corresponding to the communication transmission or reception in response to not carrying beam indication information in the MAC CE signaling.

It needs to be noted that, when the first signaling is the MAC CE signaling, MAC CE signalings corresponding to different communication transmissions or receptions may be same or different. For example, an MAC CE signaling for activating communication transmission or reception 1 may be an MAC CE signaling for activating a communication transmission or reception associated with communication transmission or reception 1, for example, communication transmission or reception 2 and/or communication transmission or reception 3. Beams of communication transmissions or receptions corresponding to communication transmission or reception 1, communication transmission or reception 2 and communication transmission or reception 3 are same. Not carrying beam indication information may include not carrying beam indication information of any communication transmission or reception, or not carrying beam indication information of part communication transmission or reception.

As a third implementation, it is incapable to determine the common beam corresponding to the communication transmission or reception in response to a time interval between a transmitting moment of a target HARQ ACK feedback and a moment corresponding to the communication transmission or reception being less than a fourth threshold value.

The target HARQ ACK feedback is an HARQ ACK feedback transmitted by the terminal device to the network device for the first signaling.

In the method for determining a beam in some embodiments, the network device transmits the first signaling to the terminal device, the first signaling is used by the terminal device to determine the scheduled communication transmission or reception, and the network device performs the communication transmission or reception using the configured target beam, which achieves the communication transmission or reception based on the determined configured target beam and improves the signal quality of the beam transmission or reception.

Corresponding to the method for determining a beam provided in the above embodiments, an apparatus for determining a beam is further provided. Since the apparatus for determining a beam according to some embodiments of the disclosure corresponds to the method for determining a beam provided in the above several embodiments of the disclosure, the implementation of the method for determining a beam is also applicable to the apparatus for determining a beam according to some embodiments, which will not be described in some embodiments.

FIG. 4 is a block diagram illustrating an apparatus for determining a beam according to some embodiments of the disclosure. As illustrated in FIG. 4, the apparatus includes a receiving module 41 and a processing module 42.

The receiving module 41 is configured to receive a first signaling from a network device, the first signaling for determining a scheduled communication transmission or reception.

The processing module 42 is configured to determine the scheduled communication transmission or reception, and perform the communication transmission or reception using a configured target beam, in response to being incapable of determining a beam corresponding to the communication transmission or reception.

Further, in an implementation of the disclosure, the first signaling is carried in a target PDCCH; and the target beam is a beam of a first CORESET, in which the first CORESET is configured for a transmission or reception of the target PDCCH.

In an implementation of the disclosure, the first CORESET and the communication transmission or reception belong to the same common beam group;

or, the first CORESET and the communication transmission or reception belong to different common beam groups.

In an implementation of the disclosure, the target beam is a beam of a second CORESET, in which the second CORESET is a CORESET with a smallest CORESET index in a target time unit of a search space that has monitored and the target time unit is a most recent time unit in each time unit of the search space.

In an implementation of the disclosure, a CORESET pool index of the second CORESET is the same as a CORESET pool index of a CORESET corresponding to a PDCCH for scheduling the communication transmission or reception.

In an implementation of the disclosure, the second CORESET and the communication transmission or reception belong to a same common beam group.

In an implementation of the disclosure, the target beam is a beam corresponding to a minimum code point in TCI code points configured by the network device.

in an implementation of the disclosure, the TCI code points are carried in a DCI signaling;

the receiving module 41 is further configured to an MAC CE from the network device, the MAC CE for indicating a corresponding relationship between the TCI code points and one or more beams; and the processing module 42 is further configured to determine the beam corresponding to the minimum code point in the TCI code points indicated in the DCI signaling according to the MAC CE.

In an implementation of the disclosure, the determining module is further configured to determine the target beam according to a common beam indicated in a second signaling;

the second signaling is a latest signaling for indicating the common beam corresponding to the communication transmission or reception in received signalings.

In an implementation of the disclosure, a time interval between a receiving moment of the second signaling and a receiving moment of the first signaling is less than a first threshold value; and/or a time interval between a receiving moment of the second signaling and a moment occupied by the communication transmission or reception is less than a second threshold value.

In an implementation of the disclosure, the processing module 42 is further configured to be incapable of determining the beam corresponding to the communication transmission or reception in response to a time interval between a receiving moment of the first signaling and a moment occupied by the communication transmission or reception being less than a third threshold value.

In an implementation of the disclosure, the processing module 42 is further configured to be incapable of determining the beam corresponding to the communication transmission or reception in response to not carrying beam indication information in the first signaling.

In an implementation of the disclosure, the processing module 42 is specifically configured to:

perform the communication transmission or reception using the configured target beam in response to being incapable of determining a common beam corresponding to the communication transmission or reception.

In an implementation of the disclosure, the processing module 42 is further configured to:

be incapable of determining the common beam corresponding to the communication transmission or reception in response to a time interval between a transmitting moment of a target HARQ ACK feedback and a moment corresponding to the communication transmission or reception being less than a fourth threshold value; the target HARQ ACK feedback is an HARQ ACK feedback transmitted by the terminal device to the network device for the first signaling.

In an implementation of the disclosure, the common beam is a beam for at least one communication transmission or reception.

In an implementation of the disclosure, the communication transmission or reception includes:

at least one of: a communication transmission or reception carried in a physical channel or a reference signal;

the physical channel includes at least one of: a PDCCH, a PDSCH, a PUCCH, a PUSCH, or a PRACH; and/or the physical channel includes at least one of channels in a sidelink.

the reference signal includes at least one of: a CSI-RS, an SRS, a PTRS, or an SSB; and/or the reference signal includes at least one of reference signals of a sidelink.

In an implementation of the disclosure, each communication transmission or reception in the common beam group corresponds to a same common beam.

In the apparatus for determining a beam provided in embodiments of the disclosure, the terminal device determines the scheduled communication transmission or reception based on the first signaling that is transmitted by the network device, and further may perform the communication transmission or reception using the target beam in response to being incapable of determining the beam corresponding to the communication transmission or reception, which achieves the communication transmission or reception based on the determined configured target beam and improves the signal quality of the beam transmission or reception.

Corresponding to the method for determining a beam provided in the above embodiments, an apparatus for determining a beam is further provided. Since the apparatus for determining a beam according to some embodiments of the disclosure corresponds to the method for determining a beam provided in the above several embodiments of the disclosure, the implementation of the method for determining a beam is also applicable to the apparatus for determining a beam according to some embodiments, which will not be described in some embodiments.

Figure 5:
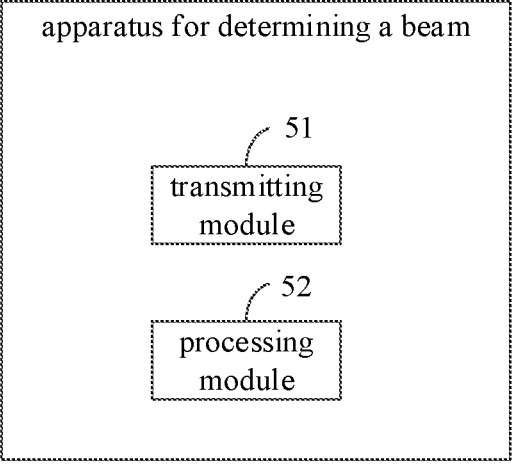
FIG. 5 is a block diagram illustrating an apparatus for determining a beam according to some embodiments of the disclosure.

FIG. 5 is a block diagram illustrating an apparatus for determining a beam according to some embodiments of the disclosure. As illustrated in FIG. 5, the apparatus includes a transmitting module 51 and a processing module 52.

The transmitting module 51 is configured to transmit a first signaling to a terminal device, the first signaling for the terminal device to determine a scheduled communication transmission or reception.

The processing module 52 is configured to perform the communication transmission or reception using a configured target beam.

In an implementation of the disclosure, the first signaling is carried in a target PDCCH;

the target beam is a beam of a first CORESET, in which the first CORESET is configured for a transmission or reception of the target PDCCH.

In a second implementation of the disclosure, the target beam is a beam of a second CORESET, in which the second CORESET is a CORESET with a smallest CORESET index in a target time unit of a search space that has monitored and the target time unit is a most recent time unit in each time unit of the search space.

In an implementation of the disclosure, the second CORESET and the communication transmission or reception belong to a same common beam group.

In an implementation of the disclosure, the target beam is a beam corresponding to a minimum code point in TCI code points configured by the network device.

In an implementation of the disclosure, the TCI code points are carried in a DCI signaling. The transmission module 51 is configured to transmit a MAC CE to the terminal device, the MAC CE for configuring beams corresponding to the TCI code points indicated in the DCI signaling.

In an implementation of the disclosure, the transmission module 51 is further configured to transmit a second signaling to the terminal device, in which the second signaling carries indication information of a common beam corresponding to the communication transmission or reception and is configured for the terminal device to determine the target beam according to the common beam corresponding to the communication transmission or reception.

In an implementation of the disclosure, a time interval between a receiving moment of the second signaling and a receiving moment of the first signaling is less than a first threshold value; and/or a time interval between a receiving moment of the second signaling and a moment occupied by the communication transmission or reception is less than a second threshold value.

In an implementation of the disclosure, the network device includes at least one TRP, there is one or more target beams, and the plurality of target beams correspond to the same TRP or different TRPs.

In an implementation of the disclosure, the communication transmission or reception is performed using the configured target beam in response to the terminal device being incapable of determining the common beam corresponding to the communication transmission or reception. In an implementation of the disclosure, the common beam is a beam for at least one communication transmission or reception.

In an implementation of the disclosure, the communication transmission or reception includes:

at least one of: a communication transmission or reception carried in a physical channel or a reference signal;

the physical channel includes at least one of: a PDCCH, a PDSCH, a PUCCH, a PUSCH, or a PRACH; and/or the physical channel includes at least one of channels in a sidelink.

The reference signal includes at least one of: a CSI-RS, an SRS, a PTRS, or an SSB; and/or the reference signal includes at least one of reference signals of a sidelink.

In an implementation of the disclosure, each communication transmission or reception in the common beam group corresponds to a same common beam.

In the apparatus for determining a beam In some embodiments, the network device transmits the first signaling to the terminal device, the first signaling is used by the terminal device to determine the scheduled communication transmission or reception, and the network device performs the communication transmission or reception using the configured target beam, which achieves the communication transmission or reception based on the determined configured target beam and improves the signal quality of the beam transmission or reception.

In order to implement the above embodiments, a communication device is further proposed in the disclosure.

The communication device in embodiments of the disclosure includes a processor, a transceiver, a memory and an executable program stored on the memory and capable of being executed by the processor. When the processor runs the executable program, the above method is performed.

The communication device may be the above terminal device or the above network device.

The processor may include various types of storage media, which are non-transitory computer storage media that may continue to memorize and store information on the communication device after the power is turned off. Herein, the communication device includes a base station or a terminal.

The processor may be connected to a memory via a bus and may be configured to read an executable program stored on the memory to perform the method as described in the method embodiments executed by the terminal device.

In order to implement the above embodiments, a communication device is further proposed in the disclosure.

The communication device in embodiments of the disclosure includes a processor, a transceiver, a memory and an executable program stored on the memory and capable of being executed by the processor. When the processor runs the executable program, the above method is performed.

The communication device may be the above terminal device or the above network device.

The processor may include various types of storage media, which are non-transitory computer storage media that may continue to memorize and store information on the communication device after the power is turned off. Herein, the communication device includes a base station or a terminal.

The processor may be connected to a memory via a bus and may be configured to read an executable program stored on the memory to perform the method as described in the method embodiments executed by the network device.

In order to implement the above embodiments, a computer storage medium is further provided in the disclosure.

The computer storage medium provided in embodiments of the disclosure has stored an executable program. When the executable program is performed by a processor, the method as described in the method embodiments executed by the terminal device is implemented.

The computer storage medium provided in embodiments of the disclosure has stored an executable program. When the executable program is performed by a processor, the method as described in the method embodiments executed by the network device is implemented.

In order to implement the above embodiments, a computer program product including a computer program is proposed in embodiments of the disclosure. When the computer program is running on a computer, the computer is caused to perform the method as described in the above method embodiments executed by the terminal device.

In order to implement the above embodiments, a computer program product including a computer program is proposed in embodiments of the disclosure. When the computer program is running on a computer, the computer is caused to perform the method as described in the above method embodiments executed by the network device.

Figure 6:
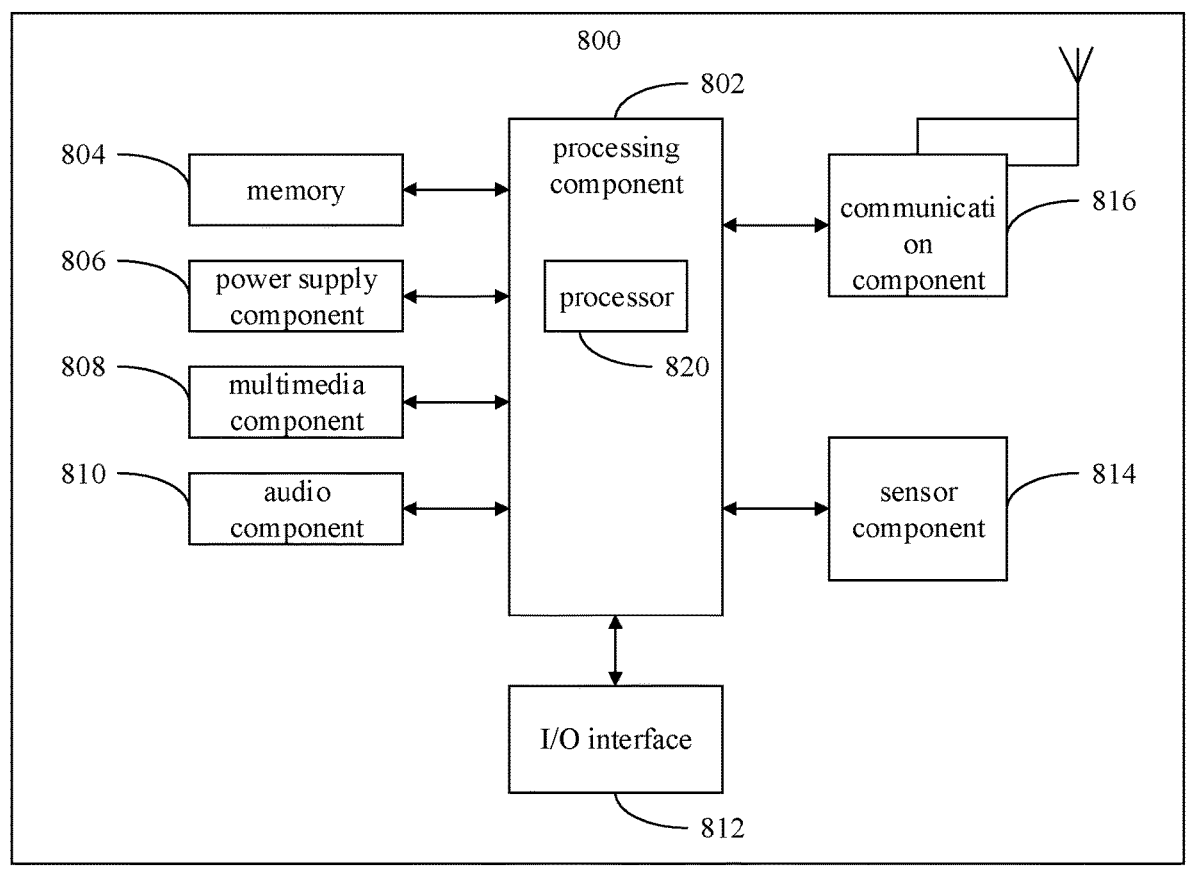
FIG. 6 is a block diagram illustrating a terminal device 800 according to some embodiments of the disclosure.

FIG. 6 is a block diagram illustrating a terminal device 800 in some embodiments of the disclosure. For example, the terminal device 800 may be a mobile phone, a computer, a digital broadcasting user equipment, a messaging device, a game console, a tablet device, a medical equipment, a fitness equipment, a personal digital assistant, etc.

Referring to FIG. 6, the terminal device 800 may include at least one of: a processing component 802, a memory 804, a power supply component 806, a multimedia component

808, an audio component 810, an input/output (I/O) interface 812, a sensor component 814, and a communication component 816.

The processing component 802 generally controls an entire operation of the terminal device 800, such as operations related to display, phone call, data communication, camera operation and recording operation. The processing component 802 may include one or more processors 820 to perform instructions, to complete all or part of steps of the above method. In addition, the processing component 802 may include at least one module for the convenience of interaction between the processing component 802 and other components. For example, the processing component 802 may include a multimedia module for the convenience of interaction between the multimedia component 808 and the processing component 802.

The memory 804 is configured to store all types of data to support an operation of the terminal device 800. Examples of the data include the instructions of any applications or methods operated on the terminal device 800, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power supply component 806 may provide power supply for all components of the terminal device 800. The power supply component 806 may include a power supply management system, at least one power supply, and other components related to generating, managing and distributing power for the terminal device 800.

The multimedia component 808 includes an output interface screen provided between the terminal device 800 and the user. In some embodiments, a screen may include a liquid crystal display (LCD) and a touch panel (TP). When the screen includes a touch panel, the screen may be implemented as a touch screen to receive input signals from the user. The touch panel includes at least one touch sensor to sense touching, sliding and gestures on the touch panel. The touch sensor may not only sense the boundary of touch or slide action, but also detect wakeup time and pressure related to the touching or sliding operation. In some embodiments, the multimedia component 808 includes a front camera and/or a rear camera. When the terminal device 800 is in operation mode, such as shooting mode or video mode, the front camera or the rear camera may receive the external multimedia data. Each front camera and rear camera may be a fixed optical lens system or an optical lens system with a focal length and an optical zoom capacity.

The audio component 810 is configured as an output and/or input signal. For example, the audio component 810 includes a microphone (MIC). When the terminal device 800 is in an operation mode, such as call mode, record mode, and speech recognition mode, the microphone is configured to receive the external audio signals. The audio signals received may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The buttons may include but not limited to a home button, a volume button, a start button and a lock button.

The sensor component 814 includes at least one sensor configured to provide various aspects of status assessment for the terminal device 800. For example, the sensor component 814 may detect the on/off state of the device 800 and the relative positioning of the component. For example, the component is the display and the keypad of the terminal device 800, the sensor component 814 may also detect the location change of the terminal device 800 or one component of the terminal device 800, the presence or absence of contact between the user and the terminal device 800, the orientation or acceleration/deceleration of the terminal device 800, and the temperature change of the terminal device 800. The sensor component 814 may include a proximity sensor, which is configured to detect presence of the objects nearby without any physical contact. The sensor component 814 may further include a light sensor such as CMOS or CCD image sensor, which is configured to use in imaging applications. In some embodiments, the sensor component 814 may further include an acceleration transducer, a gyroscope sensor, a magnetic sensor, a pressure sensor or a temperature sensor.

The communication component 816 may be configured for the convenience of wired or wireless communication between the terminal device 800 and other devices. The terminal device 800 may access wireless networks based on communication standard, such as Wi-Fi, 2G, or 3G, or their combination. In an exemplary embodiment, the communication component 816 receives broadcast signals or broadcast-related information from an external broadcast management system via a broadcast channel. In an exemplary embodiment, the communication component 816 further includes a near field communication (NFC) module to facilitate short-range communication. For example, an NFC module may be implemented based on a radio frequency identification (RFID) technology, an infrared data association (IRDA) technology, an ultra-wideband (UWB) technology, Bluetooth (BT) technology and other technologies.

In some embodiments, the terminal device 800 may be implemented by at least one of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronics components, which is configured to perform the above method.

In some embodiments, a non-transitory computer-readable storage medium including an instruction is further provided, such as the memory 804 including an instruction, and the instruction may be executed by the processor 820 of the terminal device 800 to complete the above methods. For example, the non-transitory computer readable storage medium may be a ROM, a random access memory (RAM), a CD-ROM, a magnetic tape, a floppy disk, an optical data storage device, etc.

Figure 7:
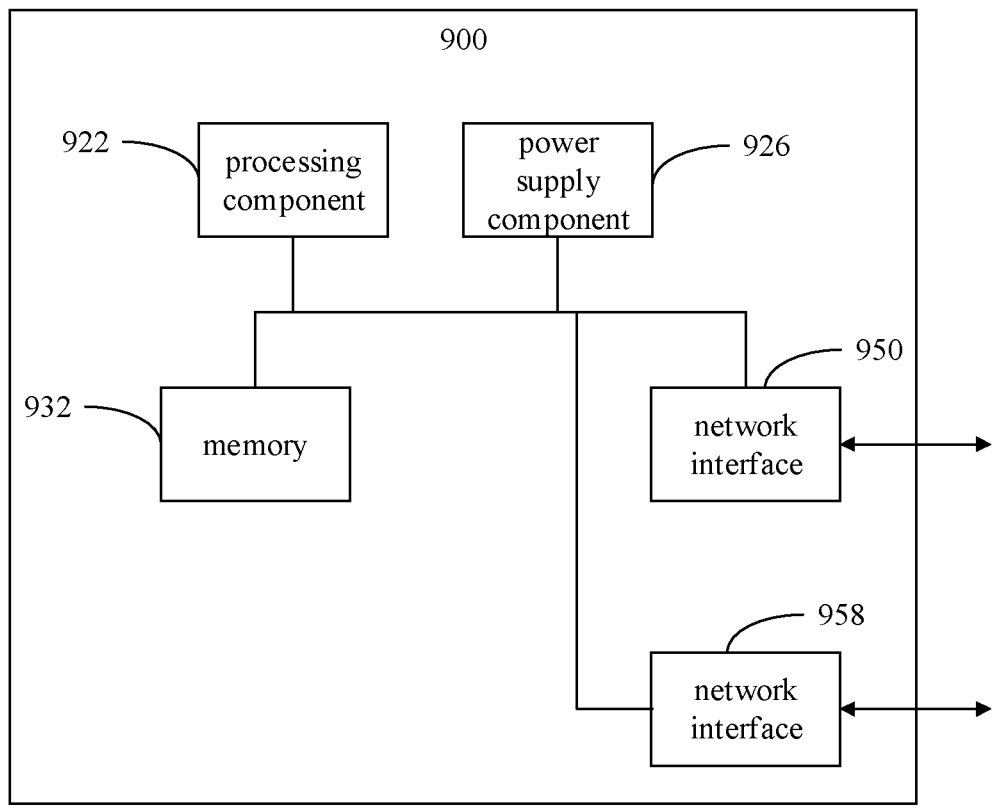
FIG. 7 is a block diagram illustrating a network device 900 according to some embodiments of the disclosure.

FIG. 7 is a block diagram illustrating a network device 900 in some embodiments of the disclosure. For example, the network device 900 may be provided as a network device. As illustrated in FIG. 7, the network device 900 includes a processing component 922, which further includes at least one processor, and memory resources represented by the memory 932, which are configured to store instructions executable by the processing component 922 for example, an application. The application stored in the memory 932 may include one or more modules each of which corresponds to a set of instructions. In addition, the processing component 922 is configured to execute instructions, to execute any one method applied to the base station as described in the above method, for example, the method as illustrated in FIGS. 2 to 3.

The network device 900 may further include one power supply component 926 configured to execute power management of the network device 900, and one wired or wireless network interface 950 configured to connect the network device 900 to a network, and one input/output (I/O) interface 958. The network device 900 may operate an operating system stored in the memory 932, for example, Windows Server™, Mac OS X™, Unix, Linux, FreeBSD™ or similar.

After considering the specification and practicing the disclosure here, those skilled in the art will easily think of other implementations. The present application is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for determining a beam, performed by a terminal device, the method comprising:

receiving a first signaling sent by a network device, the first signaling for determining a scheduled communication transmission or reception;

determining the scheduled communication transmission or reception; and performing the communication transmission or reception using a configured target beam in a case where the terminal device is incapable of determining a beam corresponding to the communication transmission or reception;

wherein the beam is a common beam, the common beam is used for at least two communication transmissions or receptions; and determining the configured target beam according to the common beam indicated in a second signaling;

wherein the second signaling is a latest signaling for indicating the common beam corresponding to the communication transmission or reception in received signalings.

2. The method of claim 1, wherein the first signaling is carried in a target physical downlink control channel (PDCCH); and the target beam is a beam of a first control resource set (CORESET), in which the first CORESET is configured for a transmission or reception of the target PDCCH.

3. The method of claim 1, wherein, the target beam is a beam of a second CORESET, in which the second CORESET is a CORESET with a smallest CORESET index in a target time unit of a search space that has monitored and the target time unit is a most recent time unit in each time unit of the search space.

4. The method of claim 3, wherein, a CORESET pool index of the second CORESET is the same as a CORESET pool index of a CORESET corresponding to a PDCCH for scheduling the communication transmission or reception.

5. The method of claim 4, wherein, the second CORESET and the communication transmission or reception belong to a same common beam group.

6. The method of claim 5, wherein each communication transmission or reception in the common beam group corresponds to a same common beam.

7. The method of claim 1, wherein, the target beam is a beam corresponding to a minimum code point in transmission configuration indication (TCI) code points configured by the network device.

8. The method of claim 7, wherein the TCI code points are carried in a downlink control information (DCI) signaling, and the method further comprises:

receiving a media access control (MAC) control element (CE) from the network device, the MAC CE for indicating a corresponding relationship between the TCI code points and one or more beams; and determining the beam corresponding to the minimum code point in the TCI code points indicated in the DCI signaling according to the MAC CE.

9. The method of claim 1, wherein a time interval between a receiving moment of the second signaling and a receiving moment of the first signaling is less than a first threshold value; and/or a time interval between a receiving moment of the second signaling and a moment occupied by the communication transmission or reception is less than a second threshold value.

10. The method of claim 1, further comprising:

being incapable of determining the beam corresponding to the communication transmission or reception in response to a time interval between a receiving moment of the first signaling and a moment occupied by the communication transmission or reception being less than a third threshold value.

11. The method of claim 1, further comprising:

being incapable of determining the beam corresponding to the communication transmission or reception in response to not carrying beam indication information in the first signaling.

12. The method of claim 1, wherein performing the communication transmission or reception using the configured target beam in response to being incapable of determining the beam corresponding to the communication transmission or reception comprises:

performing the communication transmission or reception using the configured target beam in response to being incapable of determining a common beam corresponding to the communication transmission or reception.

13. The method of claim 12, further comprising:

being incapable of determining the common beam corresponding to the communication transmission or reception in response to a time interval between a transmitting moment of a target hybrid automatic repeat request acknowledgment (HARQ ACK) feedback and a moment corresponding to the communication transmission or reception being less than a fourth threshold value; wherein the target HARQ ACK feedback is an HARQ ACK feedback transmitted by the terminal device to the network device for the first signaling.

14. The method of claim 1, wherein the communication transmission or reception comprises:

at least one of: a communication transmission or reception carried in a physical channel or a reference signal;

wherein the physical channel comprises at least one of: a physical downlink control channel (PDCCH), a physical downlink shared channel (PDSCH), a physical uplink control channel (PUCCH), a physical uplink shared channel (PUSCH), or a physical random access channel (PRACH); and the reference signal comprises at least one of: a channel state information-reference signal (CSI-RS), a sounding reference signal (SRS), a phase tracking reference signal (PTRS), or a synchronization signal block (SSB).

15. A non-transitory computer storage medium for storing computer executable instructions, wherein when the computer executable instructions are executed by a processor, the method of claim 1 is performed.

16. A method for determining a beam, performed by a network device, the method comprising:

transmitting a first signaling to a terminal device, the first signaling for the terminal device to determine a scheduled communication transmission or reception; and performing the communication transmission or reception using a configured target beam in a case where the terminal device is incapable of determining a beam corresponding to the communication transmission or reception;

wherein the beam is a common beam, the common beam is used for at least two communication transmissions or receptions;

before transmitting the first signaling to the terminal device, the method further comprises:

sending a second signaling to the terminal device, wherein the second signaling carries indication information of the common beam corresponding to the communication transmission or reception and is used for the terminal device to determine the configured target beam according to the common beam corresponding to the communication transmission or reception.

17. The method of claim 16, wherein the first signaling is carried in a target PDCCH; and the target beam is a beam of a first CORESET, in which the first CORESET is configured for a transmission or reception of the target PDCCH;

or the target beam is a beam of a second CORESET, in which the second CORESET is a CORESET with a smallest CORESET index in a target time unit of a search space that has monitored and the target time unit is a most recent time unit in each time unit of the search space;

or the target beam is a beam corresponding to a minimum code point in TCI code points configured by the network device.

18. The method of claim 16, wherein, the target beam is a beam of a second CORESET, in which the second CORESET is a CORESET with a smallest CORESET index in a target time unit of a search space that has monitored and the target time unit is a most recent time unit in each time unit of the search space.

19. A communication device, comprising:

a memory for store computer executable instructions; and a processor configured to execute the computer executable instructions to:

receive a first signaling from a network device, the first signaling for determining a scheduled communication transmission or reception;

determine the scheduled communication transmission or reception; and perform the communication transmission or reception using a configured target beam in a case where the communication device is incapable of determining a beam corresponding to the communication transmission or reception, wherein the beam is a common beam, the common beam is used for at least two communication transmissions or receptions; and determine the configured target beam according to the common beam indicated in a second signaling;

wherein the second signaling is a latest signaling for indicating the common beam corresponding to the communication transmission or reception in received signalings.

* * * * *